(12) United States Patent
Renckens

(10) Patent No.: US 6,748,595 B2
(45) Date of Patent: Jun. 8, 2004

(54) OPTICAL SCANNING DEVICE AND OPTICAL PLAYER COMPRISING SUCH A SCANNING DEVICE

(75) Inventor: Jan Michiel Gustaaf Renckens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 207 days.

(21) Appl. No.: 10/024,754

(22) Filed: Dec. 19, 2001

(65) Prior Publication Data

US 2002/0085477 A1 Jul. 4, 2002

(30) Foreign Application Priority Data

Dec. 22, 2000 (EP) .............................. 00204795

(51) Int. Cl.⁷ .............................. G11B 7/08; G11B 7/09; G11B 7/085
(52) U.S. Cl. ...................................... 720/681; 720/675
(58) Field of Search .............................. 369/244, 249; 359/819, 822, 823, 824; 720/672, 674, 675–676, 681–691

(56) References Cited

U.S. PATENT DOCUMENTS

| 4,585,308 | A | * | 4/1986 | Negoro | 359/830 |
| 4,792,674 | A | * | 12/1988 | Hirano | 250/216 |
| 5,343,332 | A | | 8/1994 | Oono et al. | 359/837 |
| 5,508,851 | A | * | 4/1996 | Tachizawa | 359/822 |
| 5,717,530 | A | * | 2/1998 | Kawamoto et al. | 359/822 |

FOREIGN PATENT DOCUMENTS

| JP | 58162914 A | * | 9/1983 | G02B/7/00 |
| JP | 05281449 A | * | 10/1993 | G02B/7/04 |
| JP | 07282452 A | * | 10/1995 | G11B/7/08 |
| JP | 08054665 A | * | 2/1996 | G03B/13/02 |
| JP | 09191665 A | * | 7/1997 | H02N/2/00 |
| JP | A11134694 | | 5/1999 | |
| JP | 2000275489 A | * | 10/2000 | G02B/7/02 |

OTHER PUBLICATIONS

Patent Abstracts of Japan, Isobe Hisao, "Attachment Mechanism For Focus Offset Adjusting Optical Element," Publication No. 10283639, Oct. 23, 1998, Application No. 09087885, Jul. 4, 1997.

* cited by examiner

Primary Examiner—William Klimowicz
(74) Attorney, Agent, or Firm—Michael E. Belk

(57) ABSTRACT

The invention relates to an optical device for scanning and/or creating an information track on an optical information carrier. The device comprises a radiation source and an optical unit with an objective lens for focusing a radiation beam originating from the radiation source on the information carrier. The optical unit comprises at least one optical component (1), which can be displaced in the direction of its optical axis (1*a*) and is mounted in a holder (5). The optical component is guided along a guide (11*a*, 11*b*, 12*a*, 12*b*), which is provided on a frame (4). According to the invention, the holder (5) comprises a bar-shaped guiding element (7), which extends in a direction parallel to the optical axis (1*a*) on both sides of the optical component (1), for displacing the optical component along the guide (11*a*, 11*b*, 12*a*, 12*b*) in order to set the optical component so as to extend in the direction of the optical axis. By virtue of said bar-shaped guiding element the optical component is accurately and stably positioned in the direction of the optical axis, and takes up only a limited amount of space.

17 Claims, 3 Drawing Sheets

OPTICAL SCANNING DEVICE AND OPTICAL PLAYER COMPRISING SUCH A SCANNING DEVICE

BACKGROUND OF THE INVENTION

Field of Invention

The invention relates to an optical device for scanning and/or creating an information track on an optically scannable information carrier, which device is provided with a radiation source and an optical system with an objective lens system for focusing a radiation beam originating from the radiation source on the information carrier, said optical system comprising at least one optical component which is accommodated in a holder and can be adjusted in the direction of its optical axis, said optical component being guidable along a guide provided on a frame.

The invention further relates to an optical player comprising a support for an optically scannable information carrier, which support can be rotated about an axis of rotation, an optical device for scanning and/or creating an information track on the information carrier, said optical device being provided with a radiation source and an optical system with an objective lens system for focusing a radiation beam originating from the radiation source on the information carrier, at least the objective lens system being displaceable, by means of a displacement device, with respect to the information carrier in a substantially radial direction relative to the axis of rotation, and the optical system comprising at least one optical component which is accommodated in a holder and can be adjusted in the direction of its optical axis, said optical component being guidable along a guide provided on a frame.

An optical device of the type mentioned in the opening paragraphs is well known because it is employed in large numbers in, for example, CD players for listening to music. Meanwhile, new applications of such optical devices are known, such as in CD ROM players for software and in DVD players for images and sound. In connection with the necessary high information density, DVD players are provided with a type of radiation source, in the form of a laser source, which differs from that used in the above-mentioned audio CD players and CD ROM players. Apart from scanning an information track on an information carrier, meanwhile such optical devices are also used to create an information track on an information carrier, which application is commercially available now. The optical device in accordance with the opening paragraph forms part of an optical player in accordance with said opening paragraph, wherein at least the objective lens system of the optical system can be radially displaced, i.e. at right angles to the information track, along a disc-shaped information carrier. As the information density on the information carrier increases, the accuracy with which the radiation beam has to be positioned on the information carrier and focused increases too. This applies, in particular, to the so-called DVD+RW standard. For this reason, it is important that all optical parts of the optical system are correctly positioned with respect to each other. This can be achieved by embodying at least one optical component of the optical system so as to be displaceable in the direction of its optical axis, so that the relevant component can be properly positioned, in the course of the manufacturing process, in the direction of its optical axis. Such adjustable optical components can be formed, for example, by a so-called collimator lens, a so-called beam shaper and/or a servo lens present between a so-called polarizing beam splitter (PBS) and a diode which converts an optical signal to an electrical signal. The functions of all these optical components will be explained in greater detail by means of the description of a preferred embodiment in accordance with the invention. To displace an optical component in the direction of its optical axis, use is made, in accordance with the prior art, of a tubular holder which is provided around the optical component and extends on either side of said component in the direction of the optical axis. In connection with the displaceability, a rail system is provided which is composed of two rod-shaped elements which are rigidly attached to the frame. The tube comprising, in its interior, said optical component can be displaced along the rail system. Such an embodiment is described in JP-A-11134694. Although said embodiment is comparatively insensitive to the risk of tilting, it still takes up much space. However, the available space is limited. This problem applies, in particular, to DVD players which should often also be suitable for traditional CDs having a comparatively limited information density. For this purpose, the optical device in accordance with the prior art is provided with a second optical system having a separate radiation source and a separate optical lens system.

SUMMARY OF THE INVENTION

It is an object of the invention to provide an optical device and an optical player of the types mentioned in the opening paragraphs, in which the adjustability of the optical components to be adjusted requires only a limited amount of space, and in which a high degree of stability of the position of the relevant component is obtained both during and after the adjusting of such a component. In addition, the optical component should not be liable to tilting during the adjusting operation, i.e. tilting about an axis extending perpendicularly to the optical axis.

To achieve this object, an optical device in accordance with the invention is characterized in that the holder comprises a rod-shaped guiding element extending parallel to the optical axis and on either side of the optical component, which rod-shaped guiding element is used to displace the optical element along the guide in order to set the optical component so as to be positioned in the direction of the optical axis.

To achieve this object, an optical player in accordance with the invention is characterized in that the optical device employed therein is an optical device in accordance with the invention.

It is to be noted that, within the framework of this invention, the expression "rod-shaped element" is to be taken to mean that this element, viewed in a direction parallel to the optical axis of this optical component, is elongated. The shape of the cross-section can be chosen freely, in principle, although certain shapes may be advantageous. In comparison with the tubular holder, the rod-shaped guiding element takes up substantially less space than the tubular holders in accordance with the prior art. In addition, the design of the holder with the rod-shaped guiding element may be such that the rod-shaped guiding element is situated on the side of the optical component where space is available.

In accordance with a preferred embodiment, the guiding element at least partly has a surface that is curved around its longitudinal axis. By virtue of this curved surface, a line contact is established between the guiding element and the guide of the frame. A line contact is more favorable than a surface contact because a line contact is better defined and causes less friction during displacement.

Preferably, only at the end portions the guiding element is in guiding contact with the guide. As a result of the comparatively large distance between, on the one hand, positions of the guiding contact between the guiding element and the guide and, on the other hand, the optical component, viewed in the direction of the optical axis of the optical component, the risk of an oblique position of the optical component relative to the plane perpendicular to the optical axis is limited, and the optical component can be accurately positioned.

In accordance with a very special preferred embodiment, a resilient element is provided which, on one side, engages the holder and, on another opposite side, engages the frame so as to cause the guiding element and the guide to co-operate. Apart from optimum guidance, such a resilient element will ensure that once a position has been set, changes to this position, for example under the influence of shocks, that might lead to the optical system becoming deranged do not take place.

The resilient element preferably acts substantially mirror symmetrically with respect to the plane defined by the optical axis and the longitudinal axis of the guiding element, as a result of which a mechanically stable situation is obtained.

To increase the stability of the adjusting mechanism, the holder is preferably provided with a further guiding element, which can be guided along a further guide of the frame, which further guiding element co-operates with the further guide, at least partly under the influence of the resilient element. In this case, the further guiding element may form a tilt axis, said further guiding element then being held against the further guide by the resilient element because of the moment equilibrium.

It is particularly advantageous if the resilient element engages the holder substantially pointwise, resulting in the formation of a substantially frictionless hinged joint, which hinges during the adjusting of the optical component.

It has been found that an Omega-shaped resilient element is very advantageous, whereby the ends of the Omega shape act towards each other and, if the resilient element is provided with an inwardly directed bend at the two ends of the Omega shape, said ends engage pointwise.

To set the optical component, the holder is preferably provided with engaging means for co-operating with a tool used to set the optical component so as to be positioned in the direction of the optical axis. The engaging means can co-operate with external engaging means of said tool, said tool being, for example, pin-shaped or fork-shaped.

Preferably, the engaging means are provided near the guiding element, so that adjusting the optical component causes no, or a minimum of, moment loads on the holder, which could lead to an undesirable oblique position of the optical component.

These and other aspects of the invention will be apparent from and elucidated with reference to a preferred embodiment described hereinafter.

DETAILED DESCRIPTION OF THE PREFERRED EMBODIMENT

Figure 1:
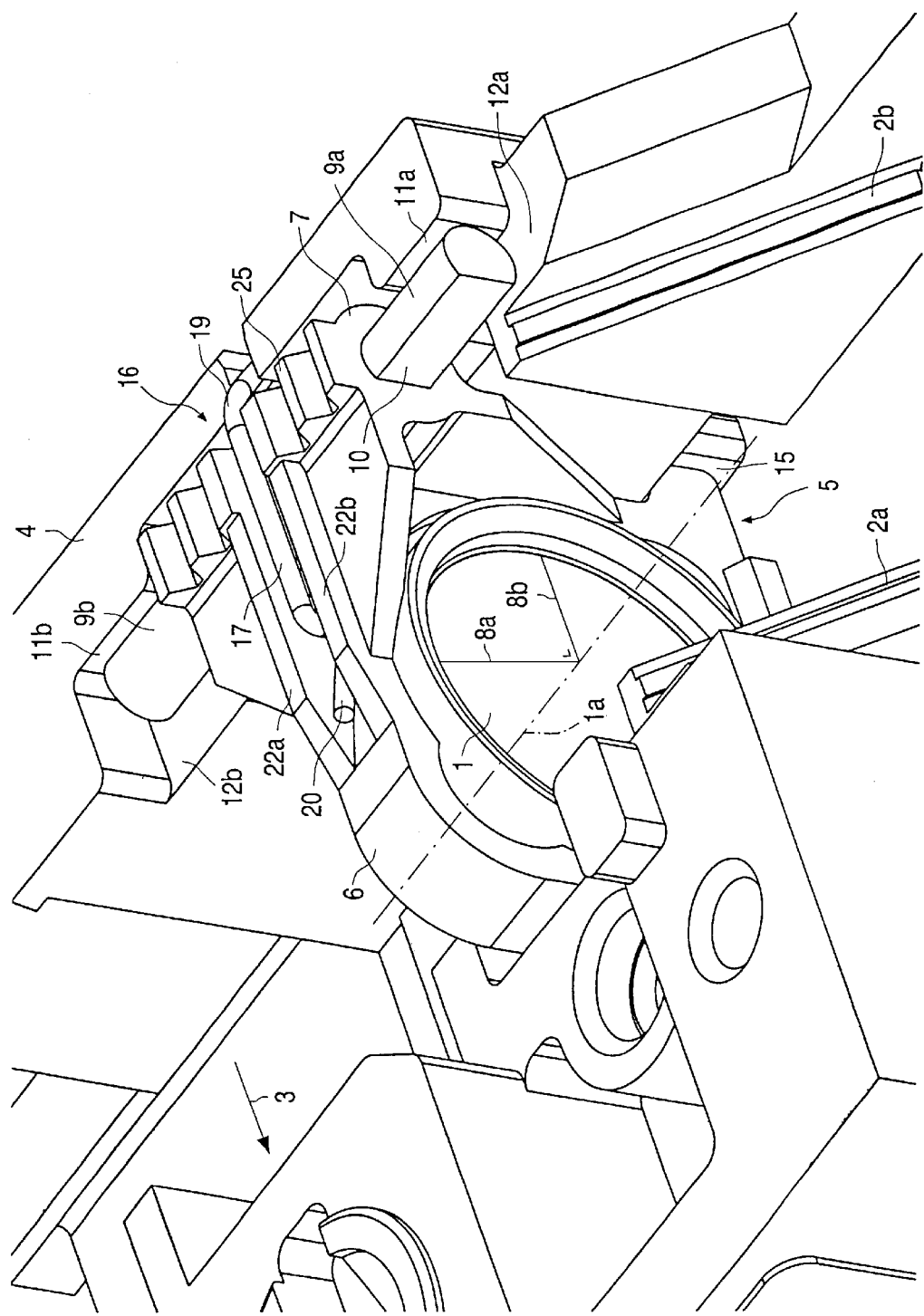
FIG. 1 is a first perspective view of the environment of a collimator lens that forms part of an optical device and an optical player in accordance with the invention.
Figure 2:
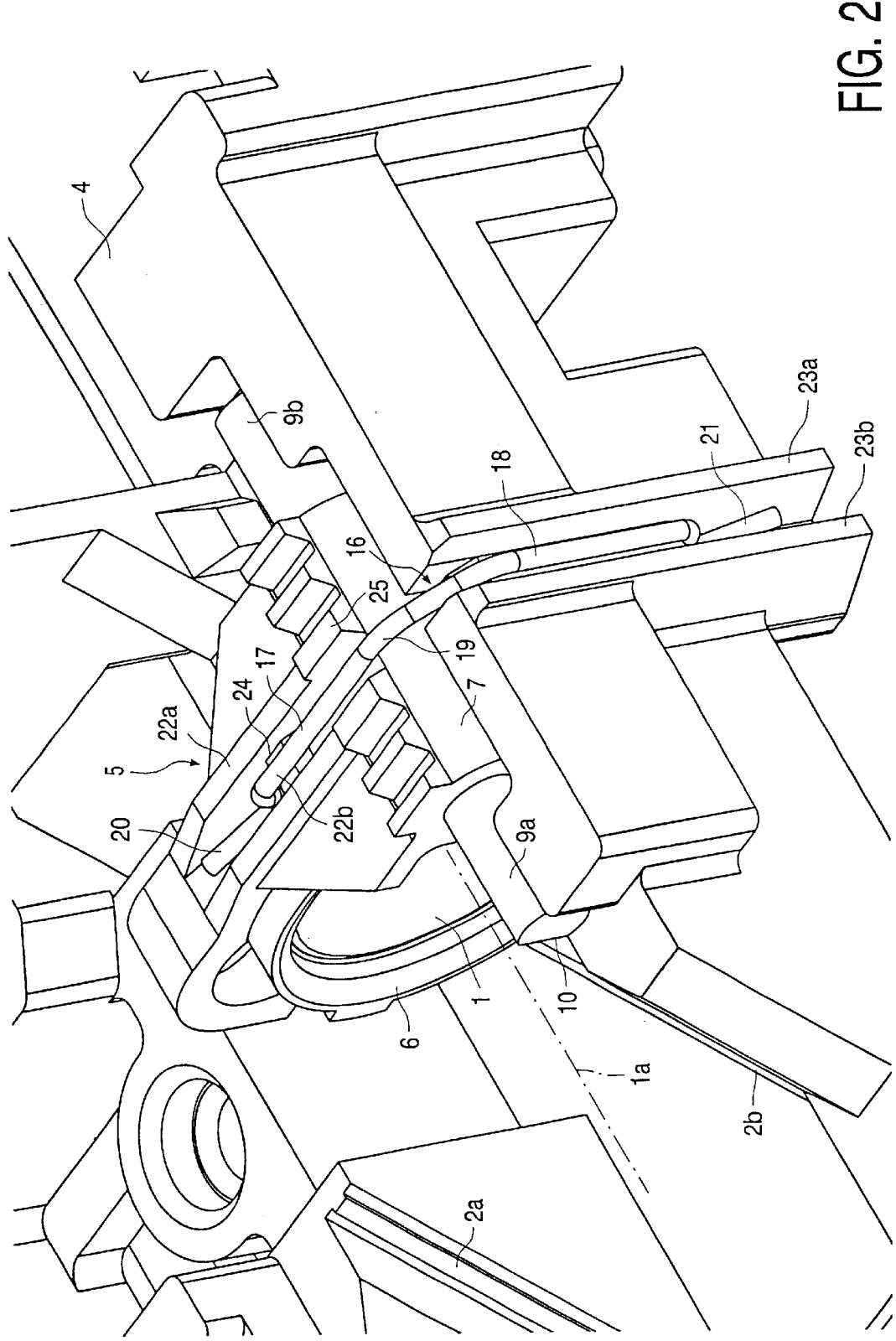
FIG. 2 is a second perspective view of the collimator lens shown in FIG. 1.

FIGS. 1 and 2 show a collimator lens 1 and the immediate environment. Collimator lens 1 forms part of a preferred embodiment of an optical device in accordance with the invention, which is used in an optical player in accordance with the invention. FIGS. 1 and 2 only show those features of the preferred embodiment of the invention that are important to the invention. Consequently, not all parts mentioned in the following description are shown in the Figures.

Collimator lens 1 is incorporated in an optical circuit that is determined by an optical system of a known and customary composition, which can be described as follows. A divergent light beam originating from a laser source passes a so-called beam shaper that brings the cross-section of the light beam into a correct circular state. Subsequently, the light beam passes a so-called polarizing beam splitter (PBS) which, dependent upon the state of polarization of the light, deflects the light beam at an angle of 90 degrees or allows free passage of said light beam. The radiation beam originating from the beam shaper will be allowed free passage by the polarizing beam splitter, after which the light beam passes collimator lens 1. Such a collimator lens has the following typical dimensions: a thickness of 1.2 mm and a cross-section of 4.4 mm. By virtue of the action of the collimator lens 1, a parallel light beam is obtained which is deflected by a corner deflector through an angle of 90 degrees. Said corner reflector is provided such that its edges rest on supporting edges 2a and 2b. The corner reflector causes the light beam to be directed in a direction perpendicular to an optical information carrier. After passing the corner reflector, the light beam passes a so-called quarter Lambda lens, as a result of which the polarization state of the light beam changes. The light beam is subsequently focused, by means of an objective lens, on the information carrier to scan or create an information track on the information carrier. To this end, the information carrier is rotated, during said operation, about an axis of rotation directed parallel to the optical axis 1a of the objective lens, and the objective lens is simultaneously displaced, by means of a displacement device of the optical player, in a direction perpendicular to the information track, i.e. in a radial direction relative to the axis of rotation. The light beam reflects at the surface of the information carrier and continues on its original path, yet in the opposite direction, as a result of which the light beam successively passes the objective lens, the quarter Lambda lens, which further changes the state of polarization, the corner reflector and the collimator lens, which has a converging influence on the light beam during the return motion. As a result of the double action of the quarter Lambda lens, the polarization state of the light beam is changed such that the polarizing beam splitter (PBS) deflects the light beam, by means of reflection at an angle of 90 degrees, in the direction indicated by means of arrow 3. The light beam will subsequently be focused on a diode by a servolens, which diode is capable of converting the optical information to electronic information.

The invention will be explained in greater detail by means of the displaceability and adjustability of collimator lens 1. It is noted emphatically that the invention can also be applied by embodying, in accordance with the invention, other optical components so as to be adjustable, such as in particular the above-mentioned beam shaper and servolens.

Figure 3:
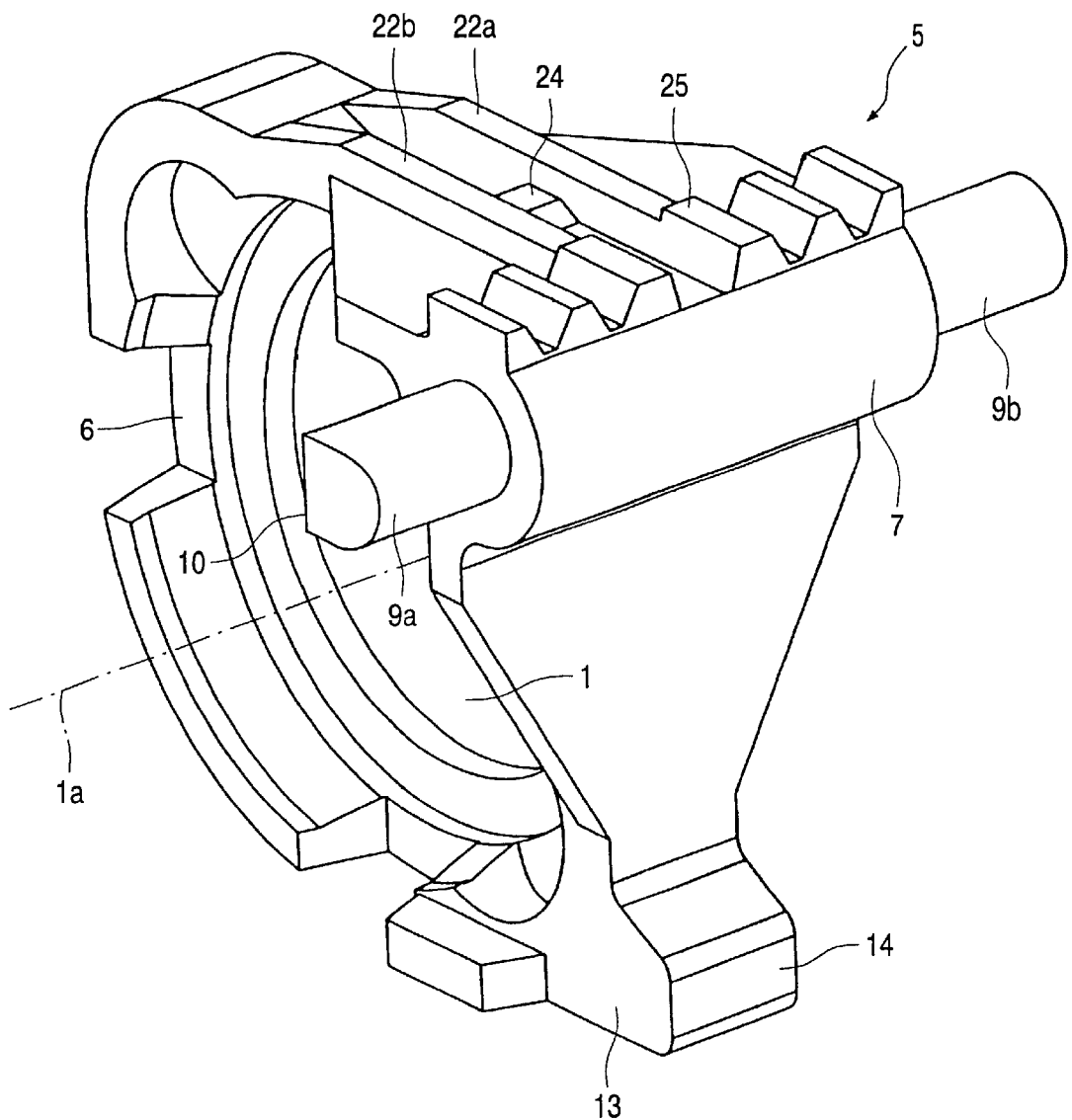
FIG. 3 is an isolated, perspective view of a collimator lens accommodated in a holder in accordance with the invention.

The above-mentioned optical components, with the exception of the information carrier, are accommodated in a frame 4 which can be displaced in a direction perpendicular to the information track. It is noted, however, that the invention also comprises embodiments in which, for example, substantially only the objective lens of the optical system can be displaced perpendicularly to the information track, while most other optical components of the optical system, including the collimator lens 1, are arranged in a fixed position in the optical player. Collimator lens 1 is accommodated in a holder 5, which is substantially composed of a ring-shaped part 6 and a rod-shaped part 7. FIG. 3 shows the collimator lens 1 accommodated in holder 5 in an isolated manner. The rod-shaped part 7 extends in a direction perpendicular to the plane of collimator lens 1, in other words parallel to the optical axis 1a of collimator lens 1. The rod-shaped part is situated within the projection of a quadrant as defined by the lines 8a and 8b. The rod-shaped part 7 is provided, at both ends, with shaft-shaped parts 9a and 9b. Shaft-shaped part 9a is provided with a flattened side 10 to create room for the corner reflector situated on supporting edges 2a and 2b. The shaft-shaped parts 9a and 9b guidably contact guiding surfaces 11a, 12a and 11b, 12b, respectively. The relevant contact is line-shaped.

The ring-shaped holder 6 is provided with a projecting portion 13 having a supporting surface 14. Said supporting surface 14 guidably contacts the guiding surface 15 of frame 4. By virtue of the three spaced apart areas at, respectively, shaft-shaped portions 9a and 9b and supporting surface 14, where guidance takes place, the holder 5 with the collimator lens 1 can be accurately displaced in the direction of the rod-shaped part 7.

Holder 5 with collimator lens 1 is held against the various guiding surfaces of frame 4 by means of the wire-shaped spring 16. Said spring 16 is substantially Omega-shaped with two straight spring portions 17 and 18 in the middle, which straight spring portions are interconnected by a curve 19. In the state shown in FIGS. 1 and 2, the straight spring portions 17 and 18 are positioned perpendicularly relative to each other. In the unloaded state, however, the straight spring portions 17 and 18 are directed more towards each other and include an angle below 90 degrees, for example 80 degrees. At its two ends, the spring 16 is provided with bent spring portions 20, 21, the bend being inwardly directed in the direction of collimator lens 1. Spring 16 is mirror-symmetrical relative to the plane extending at an angle of 45 degrees to the lines 8a and 8b, and extending in the direction of the optical axis 1a of collimator lens 1. The straight spring portion 17 and the bent spring portion 20 are accommodated between upright edges 22a and 22b of holder 5. The upright edges 22a, 22b extend at the upper side of the ring-shaped portion 6 and the rod-shaped portion 7. The straight spring portion 18 and the bent spring portion 21 are accommodated between upright edges 23a, 23b which both form part of the frame 4. The bent spring portion 20 engages pointwise behind cam 24 which extends between the upright edges 22a and 22b. The bend of the bent spring portion 21 also engages pointwise behind a cam, which cam is not visible in FIGS. 1 and 2 and which extends between the upright edges 23a and 23b. The upright edges 22a, 22b, 23a and 23b limit the risk of spring 16 being deranged, for example as a result of manual production operations.

On top of the rod-shaped portion 7 there is a row of teeth 25 that is interrupted in the middle so as to allow passage of the straight spring portion 17 of spring 16. On this row of teeth 25, the holder 5 with the collimator lens 1 can be displaced in the longitudinal direction of the rod-shaped portion 7 by manual or automated operations using a toothed tool that is not shown in further detail. The forces exerted by the tool on the holder 5 in this operation will be directed towards the contact line between the shaft-shaped portion 9a and the guiding surface 12a and the contact line between the shaft-shaped portion 9b and the guiding surface 12b. As a result, the tool will not bring about a bending moment about the longitudinal axis of the rod-shaped portion 7, so that the risk of undesirable positions of collimator lens 1 is limited.

When the holder 5 with the collimator lens 1 is displaced, the spring 16 will rotate about an axis extending parallel to the straight spring portion 18 and through the point where the bent spring portion 21 engages the frame 4. The distance between upright edges 22a and 22b and 23a and 23b is so large that such a rotation is possible. Once a position has been set, the holder 5 with the collimator lens 1 will preserve this position, which can be attributed to the fact that spring 16 brings about static friction resistance between the holder 5 and the various guiding surfaces of frame 4.

What is claimed is:

1. An optical device for scanning and/or creating an information track on an optically scannable information carrier, which device is provided with a radiation source and an optical system with an objective lens system for focusing a radiation beam originating from the radiation source on the information carrier, said optical system comprising at least one optical component which is accommodated in a holder and can be adjusted in the direction of its optical axis, said optical component being guidable along a guide provided on a frame, characterized in that the holder comprises a rod-shaped guiding element extending parallel to the optical axis and on either side of the optical component, which rod-shaped guiding element is used to displace the optical element along the guide in order to set the optical component so as to be positioned in the direction of the optical axis.

2. An optical device as claimed in claim 1, characterized in that the guiding element at least partly has a surface that is curved around its longitudinal axis.

3. An optical device as claimed in claim 1, characterized in that only at the end portions the guiding element is in guiding contact with the guide.

4. An optical device as claimed in claim 1, characterized in that the holder is provided with engaging means for co-operating with a tool used to set the optical component so as to be positioned near the guiding element.

5. An optical device as claimed in claim 4, characterized in that the engaging means are provided near the guiding element.

6. An optical device for scanning and/or creating an information track on an optically scannable information carrier, which device is provided with a radiation source and an optical system with an objective lens system for focusing a radiation beam originating from the radiation source on the information carrier, said optical system comprising at least one optical component which is accommodated in a holder and can be adjusted in the direction of its optical axis, said optical component being guidable along a guide provided on a frame, characterized in that the holder comprises a rod-shaped guiding element extending parallel to the optical axis and on either side of the optical component, which rod-shaped guiding element is used to displace the optical element along the guide in order to set the optical component so as to be positioned in the direction of the optical axis, wherein a resilient element is provided which, on one side, engages the holder and, on another opposite side, engages the frame so as to cause the guiding element and the guide to co-operate.

7. An optical device as claimed in claim 4, 5 or 6, characterized in that the resilient element engages the holder substantially pointwise.

8. An optical device as claimed in any one of the claims 4 through 7, characterized in that the resilient element is Omega-shaped.

9. An optical device as claimed in any one of the preceding claims, characterized in that the holder is provided with engaging means for co-operating with a tool used to set the optical component so as to be positioned in the direction of the optical axis.

10. An optical device as claimed in claim 9, characterized in that the engaging means are provided near the guiding element.

11. An optical player comprising a support for an optically scannable information carrier, which support can be rotated about an axis of rotation, an optical device for scanning and/or creating an information track on the information carrier, said optical device being provided with a radiation source and an optical system with an objective lens system for focusing a radiation beam originating from the radiation source on the information carrier, at least the objective lens system being displaceable, by means of a displacement device, with respect to the information carrier in a substantially radial direction relative to the axis of rotation, and the optical system comprising at least one optical component which is accommodated in a holder and can be adjusted in the direction of its optical axis, said optical component being guidable along a guide provided on a frame, wherein the guide is a rod shaped element connected to the holder through a resilient mechanism.

12. An optical player as claimed in claim 11, wherein the guide further comprises a surface that is curved around its longitudinal axis.

13. An optical player as recited by claim 11 for the comprising a slot within the holder wherein the resilient mechanism moves within a slot to adjust the optical component in the direction of its optical axis.

14. An optical player as recited in claim 13 wherein the slot is formed perpendicularly to the optical component's optical axis.

15. An optical player as recited by claim 11 wherein the resilient mechanism has at least one spring feature formed therein.

16. An optical player as recited by claim 15 wherein the resilient mechanism has at least one spring feature fastened to the guide at least one spring feature of fastened to the holder.

17. An optical player as excited by claim 11 wherein the rod shaped guide has a plurality of teeth and the resilient mechanism is disposed in a space between the plurality of teeth.

* * * * *